United States Patent Office 3,400,754
Patented Sept. 10, 1968

3,400,754
METHOD AND DEVICE FOR PROVIDING PROTECTION AGAINST SCALE FORMATION ON A HEAT EXCHANGE SURFACE
Bernard Barbu and Jean Huyghe, Grenoble, France, assignors to Commissariat a l'Energie Atomique, Paris, France
Filed Sept. 20, 1966, Ser. No. 580,703
Claims priority, application France, Oct. 4, 1965, 33,671; Aug. 19, 1966, 73,500
8 Claims. (Cl. 165—1)

ABSTRACT OF THE DISCLOSURE

Scale formation on the walls of heat exchanger tubes is prevented by flowing an auxiliary liquid from an auxiliary liquid reservoir along the wall of the tube between the wall of the tube and the liquid and in the same direction as the liquid to form a protective film. This protective film is recovered from the tubes and received in a second auxiliary reservoir and is returned to the first auxiliary liquid reservoir for recirculation.

---

Figure 1:
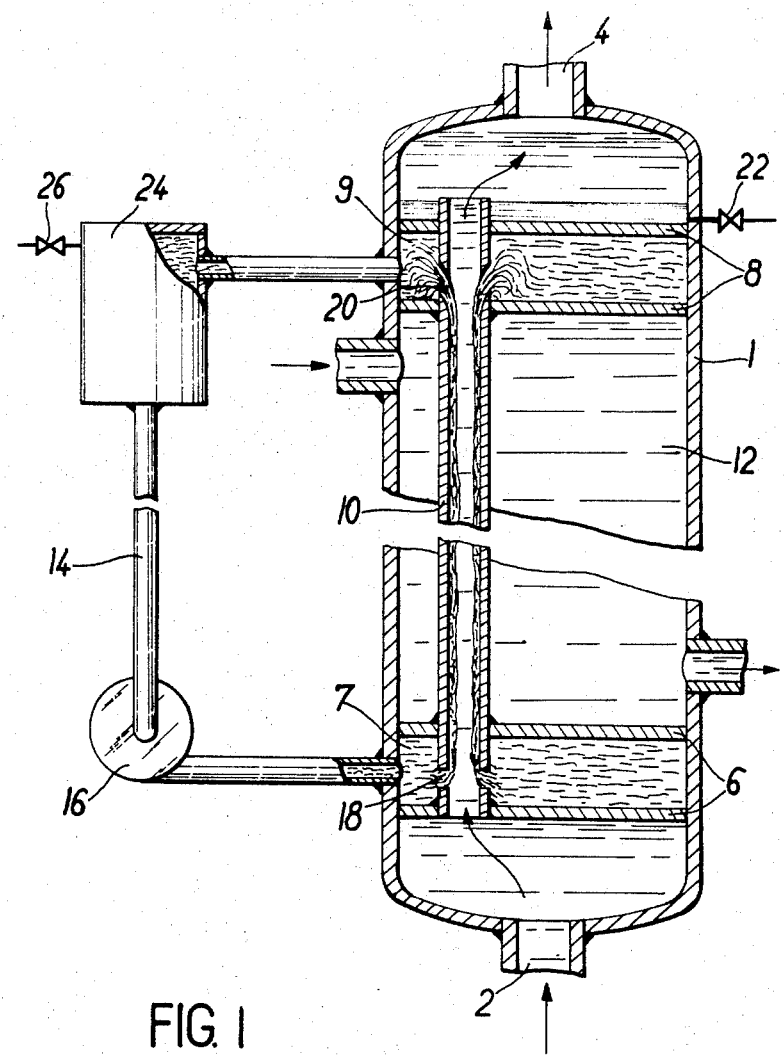

Scale formation is an evil which is commonly met with in boilers, heat exchangers and systems of like nature.

The condition is particularly frequent in systems which are designed for the purpose of cooling fluids during manufacturing processes and which make use of plain or untreated water, that is to say water which is drawn from rivers, from underground levels, or even from the sea. The difficulty is overcome in such cases by circulating untreated water inside tubes and by stopping the operation of the system at regular and often close intervals of time with a view to cleaning the tubes by means of slings or other expedients.

The problem is also encountered very often in plants for the desalination of sea water by distillation, when it is required to heat sea water to boiling point or to a temperature in the vicinity of the boiling point by means of a secondary fluid such as low-pressure steam. In this case also, the operation of the heat exchanger has to be interrupted from time to time in order to re-condition the tubes.

A substantial capital outlay in equipment is thus entailed, since it sometimes proves necessary to have standby heat exchangers in order to prevent any hold-up in production. It is in any case necessary to take into account the degradation in time of the heat transfer coefficient and to design heat exchangers of much larger size than requirements would normally justify. This entails in all cases a high cost price of the manufactured product and a loss of plant productivity.

The object of this invention is to overcome the disadvantages referred-to and to protect the walls of heating or cooling apparatus against any danger of scale formation.

The invention is accordingly directed to a method of protection which consists in forming between the wall to be protected and the fluid which is liable to deposit scale thereon a protective film which is constituted by a flow of auxiliary liquid.

According to one mode of application of the invention, the method consists in injecting the auxiliary liquid tangentially to the wall to be protected, in circulating the auxiliary liquid in a direction parallel to the direction of flow of the scale-forming fluid between said fluid and said wall and in recovering said auxiliary liquid laterally.

There is thus formed within each heat exchanger tube a liquid annular duct which prevents any contact between the fluid which is liable to produce incrustation or scale and said heat exchanger tube.

The invention also extends to a device for protecting a wall against scale formation which permits the practical application of the method referred-to above, as well as to heat exchange apparatus and other installations which are equipped with said device.

The aforesaid device is characterized in that it comprises, at one end of the wall to be protected, an auxiliary-liquid reservoir chamber which communicates with the wall surface through a series of orifices for the tangential admission of auxiliary liquid contained in said reservoir chamber and for guiding said liquid along said surface and, at the other end of the wall to be protected, an auxiliary-liquid recovery chamber which communicates with said wall surface through slots for the tangential discharge of said liquid, and variable control means for circulating the auxiliary liquid and returning said liquid from said recovery chamber to said reservoir chamber.

The liquid thus flows in a uniform and continuous manner over the entire wall to be protected and forms a protective screen over its entire surface. The flow of scale-forming fluid takes place in a direction parallel to the direction of flow of auxiliary liquid and practically without any danger of the fluid passing through the liquid or conversely.

A number of properties and advantages of the invention will become apparent from the following detailed description of embodiments which are given solely by way of non-limitative example and illustrated in the accompanying drawings.

The embodiments referred-to are both directed to the protection of heat exchanger tubes, but it is readily apparent that the method of the invention can be employed for the protection of any conduit or like component through which a fluid is circulated.

Figure 2:
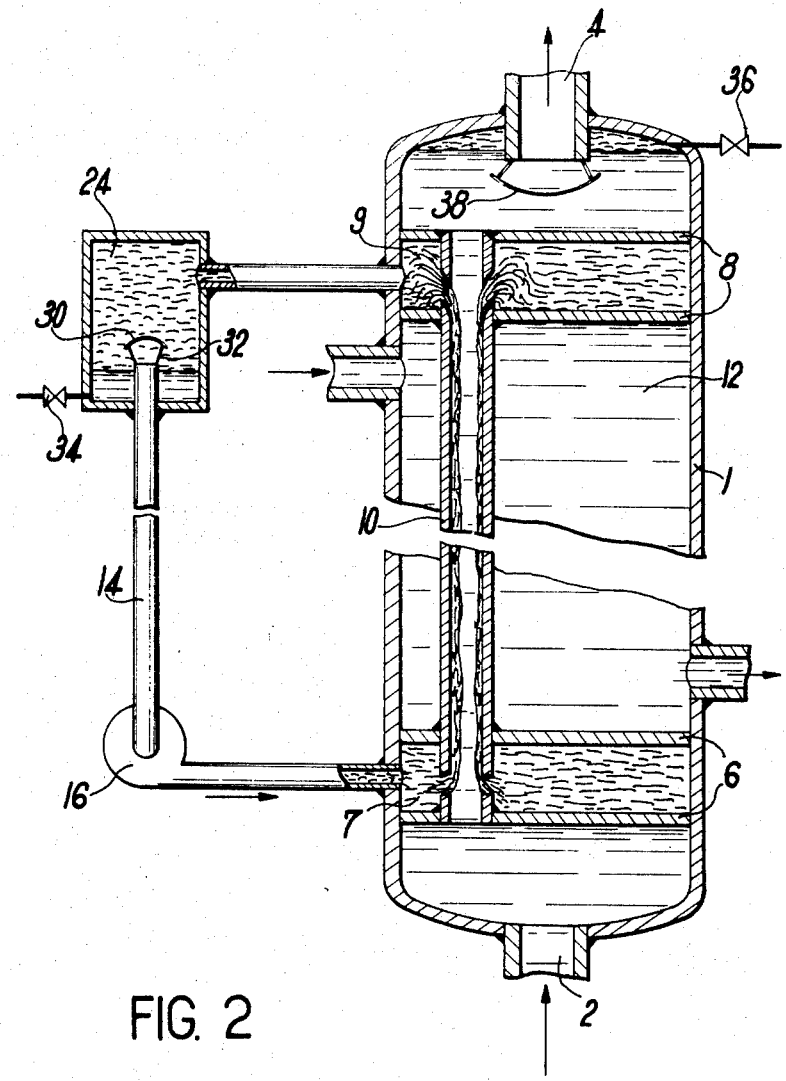

In the accompanying drawings:

FIG. 1 shows in longitudinal cross-section a heat exchanger which is protected against scale formation;

FIG. 2 also shows in longitudinal cross-section an alternative form of said heat exchanger.

As shown in FIGS. 1 and 2, the heat exchanger comprises a closed vessel or shell 1 which is provided at its two ends respectively with an inlet orifice 2 and an outlet orifice 4 for the admission and discharge of a fluid which is liable to produce incrustation, such as industrial water or sea water, and which is referred to hereinafter as scale-forming fluid. The two orifices 2 and 4 are isolated from each other by means of two partition walls 6 and 8 on which the tube elements 10 of a heat-exchange tube bank are supported. Only one of said tube elements has been illustrated for the sake of clarity of the figure.

There is located between the partitions 6 and 8 a compartment 12 through which is circulated a heat transfer fluid such as a hot fluid which washes the outer surfaces of the tube elements.

Each partition 6 and 8 is formed by a double wall which delimits a chamber 7 or 9. Said two chambers are interconnected externally of the shell 1 by means of a pipe 14 in which is placed a variable-delivery pump 16 for controlling the closed-circuit flow of an auxiliary liquid which fills the two chamber 7 and 9.

Inside the lower chamber 7 which serves as an auxiliary-liquid reserve, the tube element 10 is pierced by a series of small orifices 18 which permit the penetration of said liquid at the periphery of the stream of liquid which is admitted through the inlet 2.

Similarly, inside the upper chamber or recovery chamber 9, the tube element 10 is provided with diagonal slots 20 for the tangential discharge of the peripheral auxiliary liquid towards said chamber 9.

The auxiliary liquid which is thus injected remains along the internal wall of the tube 10 and provides a protective flow between said tube wall and the scale-forming fluid. The output of the pump 16 is adjusted to a very low value and the auxiliary liquid flows against the wall at a low velocity whilst the scale-forming fluid flows at a higher velocity in the central portion.

The scale-forming fluid thus flows within a fictitious duct, the wall of which is represented by the moving interface between said fluid and the auxiliary liquid. No contact can therefore take place between the tube and the fluid which is consequently no longer liable to induce the formation of scale.

Inasmuch as the output of the pump 16 is very low, the annulus of auxiliary liquid also has a very small thickness which may be considered as negligible compared with the radius of the tube. The heat transfer coefficient then remains substantially the same as in the case of the fluid and, since the wall remains clean, said coefficient remains unchanged irrespective of the length of service of the apparatus.

At the top portion of the tube 10, the annular film of auxiliary liquid passes through the slots 20 and collects within the chamber 9. The liquid then flows into the pipe 14 to be returned by the pump 16 into the chamber 7.

In the case of heating of water which is circulated through the tubes 10, heat-insulating material is advantageously provided around the pipe 14 and pump 16 in order to prevent any loss of heat within the auxiliary liquid system.

It is readily apparent that, when the water or other scale-forming fluid has to be brought to the boil, the auxiliary liquid employed has a boiling temperature which is higher than that of said fluid.

The auxiliary liquid is preferably not miscible with the scale-forming fluid. In the case of industrial water, the liquid employed can be, for example, tetrachlorodiphenyl of a type which is known by the trade name "Gilotherm DP4," the density of which is in the vicinity of 1.45 and the boiling temperature of which is 334° C. The tetrachlorodiphenyl circulates at a rate of 20 cm./sec. whilst the industrial water flows at a rate of 2 m./sec.

Good protection may nevertheless also be obtained by means of a liquid which is in fact miscible with the scale-forming fluid. For example, heat exchanger tube elements through which sea water was circulated at a rate of 2 m./sec. have been protected with a film of fresh water circulating at a rate of 20 to 50 cm./sec.

The difference between the flow rates of the scale-forming fluid and the auxiliary liquid is thus sufficient to ensure that the fluid is not liable to mix with the liquid and even less liable to pass through said liquid and to reach the tube element 10.

In the embodiment of FIG. 1, the top portion of the tube element 10 is designed to extend slightly above the partition 8 and a drain valve 22 is mounted in the shell. This constructional design is of special interest in the case in which the auxiliary liquid has a density which is higher than that of the scale-forming fluid. In fact, any part of said auxiliary liquid which is carried along by the fluid as this latter circulates through the tube 10 can thus be collected on the partition 8 and then be withdrawn through the valve 22 without disturbing the normal operation of the apparatus. Since the density of the auxiliary liquid is higher than that of the main fluid, said auxiliary liquid in fact falls back as soon as it leaves the tube and is deposited on the partition. The water or other fluid which leaves the shell 1 through the orifice 4 is thus free from any auxiliary liquid.

Similiarly, in order to withdraw the small quantity of water which might be transported by the auxiliary liquid as this latter flows out through the slots 20, a reservoir 24 is mounted in the pipe 14 and fitted with a drain valve 26. The relatively light fluid collects at the top of the reservoir and can readily be withdrawn. The auxiliary liquid which is returned to the chamber 7 no longer contains any water and retains all its protective properties.

FIG. 2 shows another embodiment which is more especially designed to afford protection by means of an auxiliary liquid having a density which is lower than that of the scale-forming fluid. In this embodiment, the top section of the shell 1 is fitted with a drain valve 36 whilst the outlet orifice 4 carries a deflector 38. Any drop of auxiliary liquid which may be accidentally be carried away by the scale-forming fluid would accordingly be driven by said fluid towards the top portion of the shell 1 around the outlet 4 but would be prevented from passing through said outlet by the deflector 38. The withdrawal of said liquid would then be readily effected by means of the drain valve 36. The scale-forming fluid which is collected at the delivery end of the heat exchanged has thus a high degree of purity.

The reservoir 24 is also provided with a drain valve 34 which is located near the bottom of said reservoir and at a lower level than that of the inlet of the pipe 14. Said pipe is also protected by a cap 30 which is supported by rods 32, thus permitting of only lateral penetration.

Any drop of scale-forming fluid which is carried down by the accelerated flow of auxiliary liquid through the pipe 14 into the reservoir 24 falls to the bottom of said reservoir by virtue of its density which is higher than that of the auxiliary liquid, then slides over the cap 30 and is readily withdrawn through the drain valve 34. The pipe 14 extends into the interior of the reservoir 24 and reaches a sufficient height to prevent any danger of accumulation of the fluid up to its inlet. However, the auxiliary liquid remains above the fluid, then penetrates into the pipe 14 beneath the cap 30 and returns to the pump 16. Each of the two fluids is thus purified and separated from the other.

The auxiliary liquid can thus be returned again into the tube elements 10 with the same protective properties as before.

It is understood that a number of different modifications could be made in the embodiment which has just been described by way of example. In particular, the tube elements 10 could have any configurations such as hairpin tubes, twisted tube nests or the like; the openings for the admission and discharge of liquid into and from the tube elements could have any suitable shapes for facilitating an annular flow along the internal wall of said tube element.

We claim:

1. In a method for protecting a wall against scale formation, the steps of forming between the wall to be protected and the fluid depositing scale thereon a protective film of a flowing auxiliary liquid, injecting said auxiliary liquid tangentially to the wall to be protected and to the flow of the scale depositing fluid, circulating said auxiliary liquid in the same direction as said flow between said fluid and said wall without mixing it with said fluid and then recovering said auxiliary liquid laterally of the wall.

2. A method in accordance with claim 1 wherein said auxiliary liquid is circulated in the same direction at a lower flow velocity than the velocity of the scale-depositing fluid.

3. A method in accordance with claim 1 wherein said auxiliary liquid has a higher boiling temperature than the boiling temperature of the scale-depositing fluid.

4. A method in accordance with claim 1 wherein said fluid is water and said auxiliary liquid is tetrachlorodiphenyl.

5. A method in accordance with claim 1 wherein said fluid is sea water and said auxiliary fluid is fresh water.

6. In a method of protection of a tube in accordance with claim 1, the steps of injecting an auxiliary liquid tangentially to the inlet of the tube around the periphery of the scale-depositing fluid which is circulated through said tube; then circulating an annular flow of said auxiliary liquid in a direction parallel to the direction of flow of the scale-depositing fluid between said fluid and said tube; then recovering said auxiliary liquid laterally at a point close to the outlet of said tube; and then re-injecting said auxiliary liquid at the inlet of the tube.

7. A heat exchanger protected against scale formation comprising a closed shell, an inlet at one end and an outlet at the other end of said shell, two spaced tube sheets, a tube bank supported by said tube sheets through which a scale forming first heat exchange fluid is circulated, a compartment defined by said two tube sheets in which a second exchange fluid flows transversely of said tubes, a chamber in said shell containing an auxiliary liquid formed by each of said tube sheets and by a wall spaced therefrom, orifices in and adjacent the upstream end of said tubes opening into one of said chambers and inclined with respect to the axis of said tubes for the tangential admission of the auxiliary liquid along the tube walls around the scale forming first heat exchange fluid and in the direction of flow thereof, slots in and adjacent the downstream end of and inclined with respect to the axis of said tubes opening into the other of said chambers for the tangential discharge of said auxiliary liquid into said other chamber and means for circulating said auxiliary liquid between said chambers.

8. A heat exchanger in accordance with claim 7, comprising a valve for the withdrawal of auxiliary liquid which has been transported by the scale-forming first heat exchange fluid, said valve being mounted above the outlet chamber and a reservoir fitted with a valve for draining-off scale-forming first heat exchange fluid which has been transported by said auxiliary liquid, said valve being mounted in the supply system upstream of the pump.

References Cited

UNITED STATES PATENTS

| 1,557,838 | 10/1925 | Hiller | 165—174 X |
| 2,482,262 | 9/1949 | Goddard | 60—265 X |
| 3,274,752 | 9/1966 | Huyghe et al. | 55—89 |
| 538,557 | 4/1895 | Theisen | 159—13 X |
| 1,631,162 | 6/1927 | Sebald | 165—174 X |
| 2,334,959 | 11/1943 | Rosenblad | 159—13 |
| 2,498,752 | 2/1950 | Copeland | 165—174 X |
| 2,545,028 | 3/1951 | Haldeman | 159—6 X |
| 3,019,618 | 2/1962 | Meyer | 165—134 X |
| 3,307,616 | 3/1967 | Giger | 165—134 X |

FOREIGN PATENTS

| 1,060,884 | 7/1959 | Germany. |
| 603,783 | 8/1960 | Canada. |

ROBERT A. O'LEARY, *Primary Examiner.*

A. W. DAVIS, *Assistant Examiner.*